(12) United States Patent
Watadani

(10) Patent No.: US 6,499,805 B1
(45) Date of Patent: Dec. 31, 2002

(54) HEAD REST AND METHOD OF MANUFACTURING HEAD REST

(75) Inventor: Takeshi Watadani, Okayama (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/554,381

(22) PCT Filed: Jun. 4, 1999

(86) PCT No.: PCT/JP99/03007

§ 371 (c)(1),
(2), (4) Date: May 10, 2000

(87) PCT Pub. No.: WO00/15082

PCT Pub. Date: Mar. 23, 2000

(30) Foreign Application Priority Data

Sep. 11, 1998 (JP) ............................................ 10-258152

(51) Int. Cl.⁷ ................................................ B60N 2/48
(52) U.S. Cl. ....................................... 297/408; 297/391
(58) Field of Search ................................. 297/391, 408, 297/410

(56) References Cited

U.S. PATENT DOCUMENTS 4,682,817 A  *  7/1987  Freber ......................... 297/408
4,859,994 A  *  8/1989  Yamashita ................... 297/391
5,967,612 A  * 10/1999  Takei .......................... 297/391

FOREIGN PATENT DOCUMENTS

FR           2526731   * 11/1983  ................. 297/391
JP           3-295617    12/1991
JP           6-143307     5/1994
JP           8-155981     6/1996

OTHER PUBLICATIONS

Microfilm of specification and drawings annexed to the request of Japanese Utility Model Application No. 1-142549 (Laid-open No. 3-79747, Aug. 14, 1991).
Microfilm of specification and drawings annexed to the request of Japanese Utility Model Application No. 54-47107 (Laid-open No. 55-148450, Oct. 25, 1980.

* cited by examiner

Primary Examiner—Peter R. Brown
(74) Attorney, Agent, or Firm—Renner, Kenner, Greive, Bobak, Taylor & Weber

(57) ABSTRACT

A headrest having a stay frame assembly (10) including a base frame (11) having at least one leg part (12) extending downward, a head frame (14) connected to a top part of the base frame so as to freely rotate the head frame backward and forward with respect to the base frame, and a head angle adjusting mechanism (20) for adjusting an angle of the head frame with respect to the base frame; an inner cover (30) having a box part (31) for containing the head frame and the head angle adjusting mechanism, and a plate part (32) connected to a bottom (36) of the box part so as to leave a gap (35) between the plate part and the bottom of the box part; a surface material (70) having an inner space and an opening communicating with this inner space, an outline of the surface material corresponding to an outline of the headrest; and a foamed cushion pad (60) molded together with the surface material such that a liquid expandable material is foamed in the inner space of the surface material so as to cover around the box part of the inner cover.

19 Claims, 5 Drawing Sheets

(a)

(b)

(a)

(b)

HEAD REST AND METHOD OF MANUFACTURING HEAD REST

TECHNICAL FIELD

The present invention relates to a headrest and a method for manufacturing the headrest that is attached to a seat used as an automobile seat, a business seat, a consultation seat or a seat for house use. In particular, the present invention relates to a headrest that has a head angle adjusting mechanism and is manufactured by foaming and molding an expandable material together with a surface material and a method for manufacturing such a headrest.

TECHNICAL BACKGROUND

A headrest of the art comprises a metallic or plastic stay frame as a skeleton of the headrest, a box like shaped surface material and a foamed cushion pad molded together with the surface material. Note that the surface material is seamed into a desirable box like shape, and a top part of the stay frame is capped with the surface material. Then, a liquid expandable material such as urethane is injected inside the box like shaped surface material and is foamed and molded together with the surface material. (see, for example, Japanese Patent Laying-Open No. Heisei 3(1991)-295617)

The surface material is manufactured by seaming several sheet materials into a box like shape corresponding to an outline of the headrest. Its margin is seamed as necessary to hide inside the box like shaped surface material to make the appearance of the surface material better. Thus, the seat materials are firstly seamed so as to appear in the inner side of the box like shaped surface material and provide an opening in a part corresponding to a bottom of the headrest. Then, the inner side of the surface material is disappeared by passing the surface material through the opening so as to appear as its outer side. Also, the top part of the stay frame is inserted in the surface material through this opening. The stay frame comprises the U-shaped top part and a pair of leg parts extending downward from both ends of this top part.

The foamed cushion pad is molded together with the surface material as follows. The top part of the stay frame is inserted in the box like surface material. Then, a liquid expandable material is injected in the surface material and is foamed. In Japanese Patent Laying Open No. Heisei 3(1992)-295617 described above, means for preventing a leakage of the liquid expandable material injected through the opening are described. The means comprise upper and lower plates having an opening for a liquid expandable material injecting nozzle and two holes for passing the leg parts of the stay frame, respectively. The leg parts of the stay frame pass through the holes of those plates so as to place those plates at a predetermined position corresponding to the bottom of the headrest. One plate is disposed in parallel to another plate, and a gap is provided between those plates. Note that the upper plate has a window as a fluid passage communicating with the gap between those plates. The opening of the surface material is inserted and freely held in the gap between those plates, and the upper plate having the fluid passage is disposed inside the surface material. Then, the liquid expandable material injecting nozzle is inserted in the inner space of the surface material through the openings coaxially provided in both plates and the liquid expandable material is injected and foamed therein. Note that the liquid expandable material injected passes through the fluid passage of the upper plate and is introduced between the upper plate and a circumferential portion of the opening of the surface material. This liquid expandable material is foamed and cured, and thereby, the opening of the surface material is completely closed.

Recently, a vehicle having a variety of functions has been developed. For example, in order to contain more passages or the like in a vehicle, a seat back is used as a part of a bed such that a rear seat is collapsed forward to create more space for containing more passages.

In such a vehicle, a rear seat must be tilted forward completely to make more space. However, if a non-tilt type headrest of the art as described above is attached to the rear seat, the rear seat touches on a seat back of a front seat when the rear seat is tilted. Thus, the rear seat cannot be tilted completely so that enough space cannot be created. In addition, in this case, if the headrest is detached from the rear seat, the rear seat can be tilted completely. However, additional space for putting the detached headrest will be required.

In view of those problems, it has been presented to attach a headrest having a head angle adjusting mechanism to a rear seat. This is because the rear seat can be tilted forward completely by tilting the headrest attached to the rear seat.

However, in a headrest incorporating such a head angle adjusting mechanism, the head angle adjusting mechanism is attached to the top part of the stay frame and, as well as a headrest of the art described above, the top part of the stay frame is capped with a surface material. Thus, if the liquid expandable material is injected inside the surface material and is foamed therein, a foamed cushion pad is formed so as to introduce into structural components of the head angle adjusting mechanism, and as a result, this pad hampers the functions of the head angle adjusting mechanism.

In addition, in order to recycle parts used for a vehicle, it is demanded to make components of a vehicle such as a headrest into pieces without taking much time and costing much labor. However, if a headrest has complex structures, it becomes difficult to make such a headrest into pieces, and thus, such a demand cannot be achieved.

Therefore, an object of the present invention is to provide a novel headrest and a headrest manufacturing method in which a foamed cushion pad is molded together with a surface material so as not to introduce a liquid expandable material into structural components of a head angle adjusting mechanism and it can be done to make the headrest into pieces without taking much time and costing much labor in order to recycle its components.

SUMMARY OF THE INVENTION

A headrest according to the present invention comprises:
(1) a stay frame assembly as a skeleton of the headrest comprising a base frame having at least one leg part extending downward, the leg part serving to attach the headrest to a seat; a head frame connected to a top part of the base frame so as to freely rotate the head frame backward and forward with respect to the base frame; and a head angle adjusting mechanism for adjusting an angle of the head frame with respect to the base frame;
(2) an inner cover comprising a box part for containing the head frame and the head angle adjusting mechanism; and a plate part connected to a bottom of the box part so as to leave a gap between the plate part and the bottom of the box part, at least one slot being formed in the plate part and this slot communicating with an inner space of the box part;
(3) a surface material having an inner space and an opening communicating with this inner space, an outline of the surface material corresponding to an outline of the headrest; and (4) a foamed cushion pad molded together with the surface material such that a liquid expandable material is foamed in the inner space of the surface material so as to cover around the box part of the inner cover.

The head frame is covered with the inner cover such that the leg part of the base frame passes through the slot and extends outside the box part. The head angle adjusting mechanism of the stay frame is also covered with the box part so as to rotate the head frame backward and forward together with the inner cover.

Such a headrest can be manufactured as follows.

(Step 1)

The head frame is covered with the inner cover such that the leg part of the base frame passes through the slot and extends outside the box part, and the head angle adjusting mechanism of the stay frame is covered with the box part so as to rotate the head frame backward and forward together with the inner cover.

Note that the box part of the inner cover comprises two portions such as a first portion and a second portion, and the plate part described above is connected to the first portion so as to have a gap between the plate part and the bottom of the box part. That is, the head frame and the head angle adjusting mechanism are placed inside the first portion of the box part so as to pass the leg of the base frame, and then, the second portion is liquid-tightly attached to the first portion so as to form the box part. Thereby, the head frame and the head angle adjusting mechanism are covered with the inner cover.

Those portions can be liquid-tightly attached each other by fitting a tongue formed along an edge of one portion with a slot formed along an edge of another portion and then latching those portions. Then, the inside of the box part of the inner cover is formed, and the head frame of the stay frame assembly is fixed inside the inner cover so that the head frame is one body with the inner cover. The slot formed in the plate part is communicated with the inside of the inner cover and is formed so as to rotate the head frame backward and forward together with the inner cover with respect to the base frame. Preferably, a shape of the slot formed in the plate part is an elliptic shape extending from the front side to the rear side.

The first and second portions of the box part of the inner cover have first and second openings, respectively, so as to form a central opening passing through the box part from the front side to the rear side when one portion is attached to another portion as described above. The first and second openings are connected to each other by fitting a tongue formed on an edge of one opening with a slot formed on an edge of another opening and then latching those portions. A fluid passage is provided in a part of the bottom of the first portion of the box part so as to communicate with the gap between the plate part and the bottom of the first portion. Meanwhile, a hollow is formed below the second opening of the second portion, and the position and the size of the hollow correspond to the part of the bottom of the first portion having the fluid passage. Thus, when the first and second portions are connected to each other, the part of the bottom of the first portion is exposed through the hollow of the second portion. In addition, a liquid expandable material injecting nozzle inlet is provided in the first portion so as to vertically pass through both of the plate part and the part of the bottom of the first portion having the fluid passage. Also, a liquid expandable material injecting nozzle guide channel is provided just below the second opening of the second portion. Preferably, the fluid passage provided in the part of the bottom of the first portion is formed of a plurality of ribs, and a plurality of ribs are also provided vertically along an outer surface of a lower part of the first portion so as to enter the ribs into the gap between the plate part and the bottom of the first portion.

(Step 2)

The box part of the inner cover is inserted inside the surface material through the opening of the surface material, and a circumferential portion of the opening of the surface material is inserted in the gap between the plate part and the bottom of the inner cover. The circumferential portion of the opening is not tightly held in the gap. That is, this circumferential portion is freely held between the plate part and the bottom of the box part so as to allow the expansion of the whole of this surface material and not to produce a local tensile stress on the circumferential portion of the opening when a liquid expandable material is injected and foamed between the surface material and the box part.

(Step 3)

A liquid expandable material is injected between the surface material and the box part of the inner cover and is then foamed. Thereby, a foamed cushion pad molded together with the surface material is formed so as to cover around the box part of the inner cover. Meanwhile, the liquid expandable material flows between the bottom of the box part and the circumferential portion of the opening of the surface material freely held between the bottom of the box part and the plate part is foamed and cured so that the circumferential portion of the opening of the surface material is tightly held between the bottom of the box part and the plate part so as to completely close the opening of the surface material in the gap between the bottom of the box part and the plate part.

The liquid expandable material is injected between the surface material and the box part through the opening provided in the part of the bottom of the first portion of the box part. The liquid expandable material injected flows over the outer surface of the second portion of the box part, and a part of this liquid expandable material flows between the bottom of the inner cover and the circumferential portion of the opening of the surface material freely held between the bottom of the first portion of the box part and the plate part, through the fluid passage provided in the part of the bottom of the first portion of the box part. Meanwhile, a part of the liquid expandable material flows upward over the outer surface of the second portion of the box part, passes through the central opening passed through the box part so as to flow this liquid expandable material to an outer surface of the first portion of the box part and flows over the outer surface of the first portion. As described above, the ribs are preferably provided vertically along the lower surface of the first portion so as to enter the ribs into the gap between the bottom of the first portion and the plate part, and a part of this liquid expandable material is introduced over the outer surface of the first portion, flows between the bottom of the inner cover and the circumferential portion of the opening of the surface material freely held between the bottom of the first portion of the box part and the plate part, through the ribs. As described above, the liquid expandable material injected is supplied around the whole of the box part and is then foamed, and thereby, the foamed cushion pad molded together with the surface material is formed.

BEST MODE FOR CARRYING OUT THE INVENTION

Figure 1:
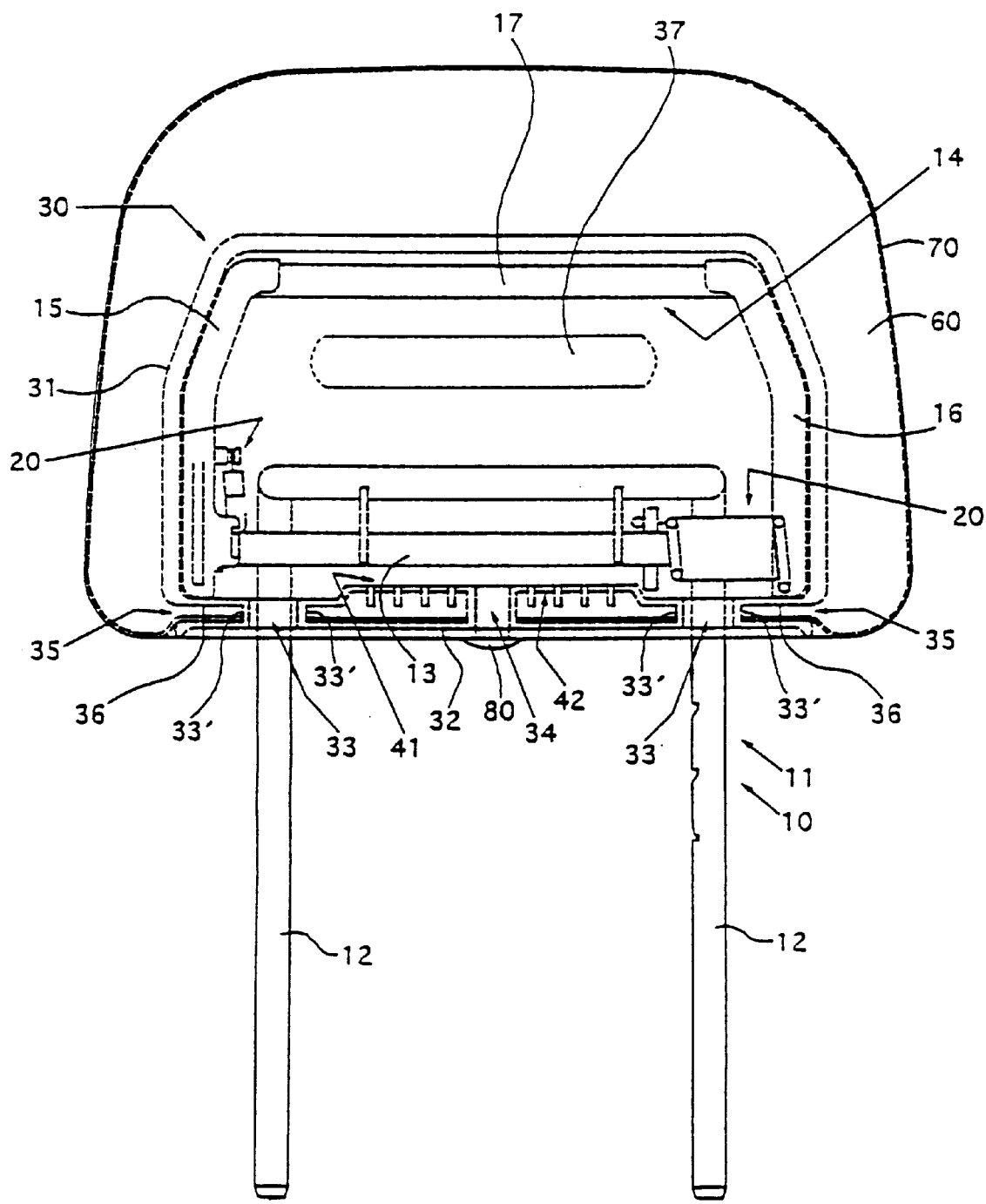
FIG. 1 is a front view of a headrest according to the present invention, and its inner structure is shown by dotted lines.

With reference to FIG. 1, a headrest of the present invention comprises: a stay frame assembly 10 as a skeleton of the headrest; an inner cover 30 comprising of a box part 31 and a plate part 32 connected to a bottom 36 of the box part 31 so as to leave a gap 35 between the bottom 36 of the box part 31 and the plate part 32; and a foamed cushion pad 60 molded together with a surface material 70 so as to cover around the box part 31 and enter in the gap 35 between the bottom 36 of the box part 31 and the plate part 32.

Figure 2:
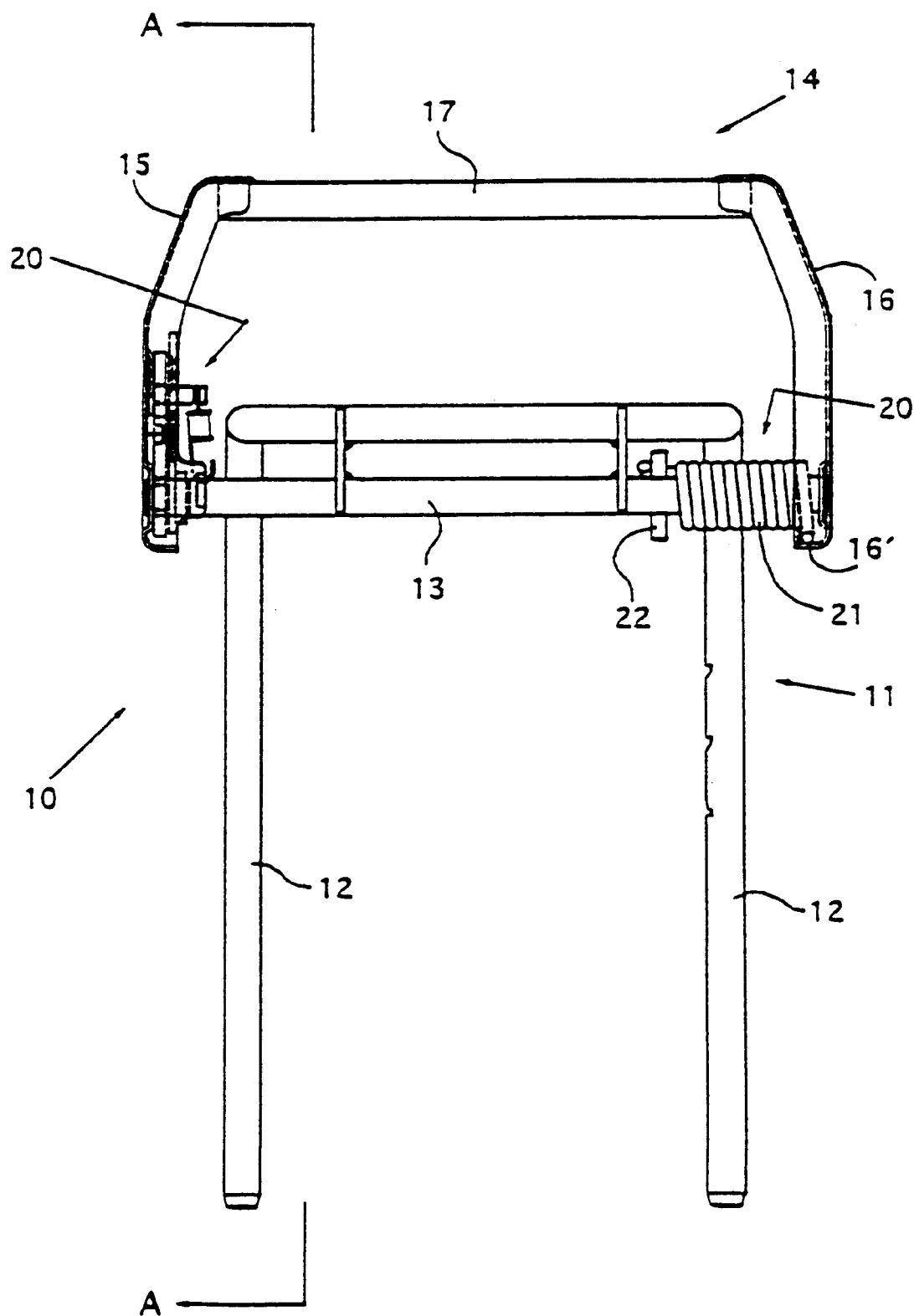
FIG. 2 is a front view of a stay frame assembly of a headrest according to the present invention.
Figure 3:
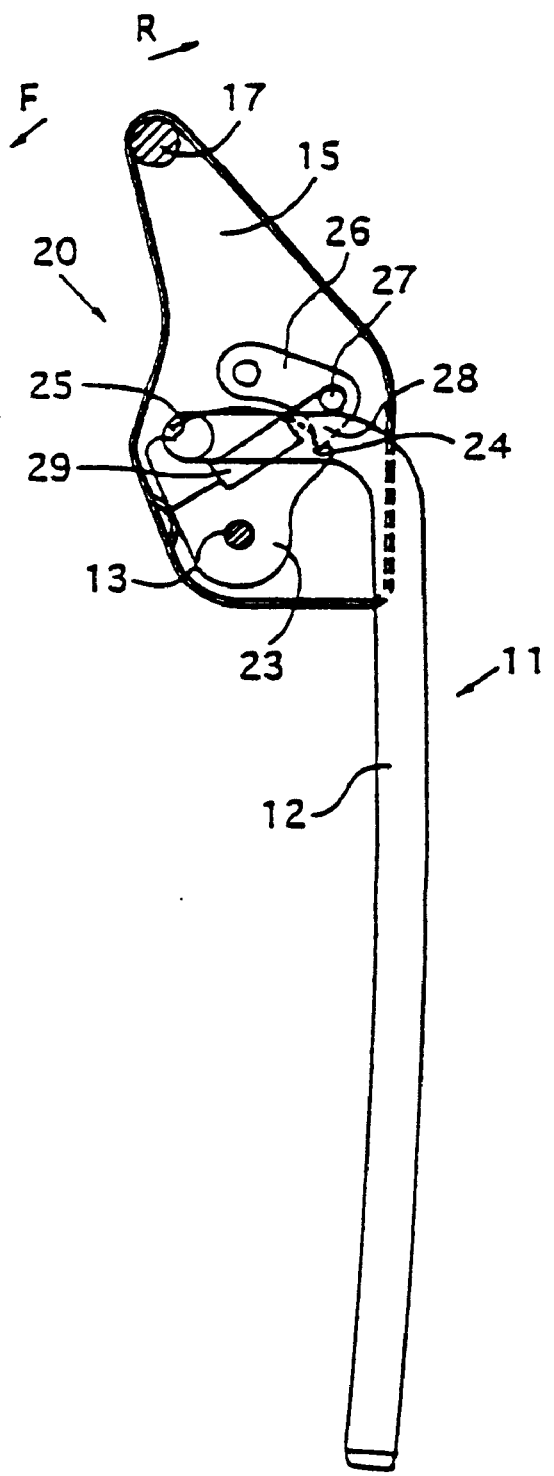
FIG. 3 is an A—A sectional view of FIG. 2 showing a head angle adjusting mechanism.

As shown in FIGS. 1–3, the stay frame assembly 10 comprises: a U-shaped base frame 11 having a pair of leg parts 12 extending downward; and a U-shaped head frame 14 connected to a top part of the base frame 11 so as to freely tilt backward and forward with respect to the base frame 11.

The top part of the base frame 11 is bent forward so as to take a right angle to the leg parts 12 (see FIG. 3), and an axial rod 13 extending crosswise is rigidly connected to the bent top part of the base frame 11 so as to be positioned below this bent part. As described above, a pair of leg parts 12 is formed in a lower part of the base frame 11 so as to extend downward. Those leg parts 12 are inserted in openings (not shown) provided in a top part of a seat back, and thus, the headrest can be attached to the seat.

As shown in FIG. 2, the head frame 14 comprises a pair of triangular side plates 15, 16 (the left side plate 15 is shown in FIG. 3) and a connecting rod 17. The upper parts of those side plates 15, 16 are rigidly connected to both end parts of this connecting rod 17, respectively, so as to face each other, and thus, the head frame 14 has a U-shaped form. The lower parts of the left and right side plates 15, 16 are connected to the axial rod 13 rigidly connected to the base frame 11, respectively, so as to freely rotate backward and forward with respect to this axial rod 13.

In order to adjust a head angle (or tilting angle) of the head frame 14 with respect to the axial rod 13, a head angle adjusting mechanism 20 is incorporated in the stay frame assembly 10. As the head angle adjusting mechanism 20 used for the headrest according to the present invention, a conventional type head angle adjusting mechanism broadly used for adjusting a tilting angle of a seat back can be used.

The head angle adjusting mechanism 20 illustrated is simply described below. With referring to FIG. 2, a spring 21 is disposed such that one end of the spring 21 is hooked on a pin 22 rigidly connected to the axial rod 13 and another end of the spring 21 is placed and pressed on a flange 16' of the right side plate 16, so that a rotational force is always acting on the head frame 14 so as to rotate the head frame 14 backward (i.e. a direction shown by an arrow R in FIG. 3). With reference to FIG. 3, such a rotation of the head frame 14 with respect to the axial rod 13 is stopped by engaging a hook portion 28 of a stopper 26 freely attached to the left side plate 15 into grooves 24, 25 provided on a circumference of a cam 23 rigidly attached to the left side plate 15. As shown in FIG. 3, in order to ensure engagement of the hook portion 28 in each groove 24 and 25, another spring 29 is disposed such that one end of the spring 29 is attached to the left side plate 15 and another end thereof is attached to the stopper 26. When the head frame 14 is tilted forward (i.e. a direction shown by an arrow F), the hook portion 28 of the stopper 26 is disengaged from the groove 24 and the stopper 26 rotates together with the left side plate 15 forward with respect to the axial rod 13. The stopper 26 moves along the rim of the cam 23 and then engages into the groove 25. The head angle of the head frame 14 with respect to the base frame 11 depends on each position of the groove provided on the rim of the cam 23. Note that the head angle adjusting mechanism 20 has an additional mechanism (not shown) for disengaging the hook portion 28 of the stopper 26 from the groove 25 when the head frame 14 is further tilted forward and then returning the stopper 26 to its original position together with the left side plate 15 by the rotational force acted on the left side plate 15 that is generated by the spring 21 so as to engage the hook portion 26 into the groove 24.

As shown by a dotted line in FIG. 1, the inner cover 30 comprises a box part 31 and the plate part 32 rigidly connected to the bottom 36 of the box part 31 so as to leave the gap 35 between the bottom 36 and the plate part 32. The plate part 32 has slots 33 communicating with an inner space of the box part 31 and is connected by walls 33' that form the slots 33.

Figure 4:
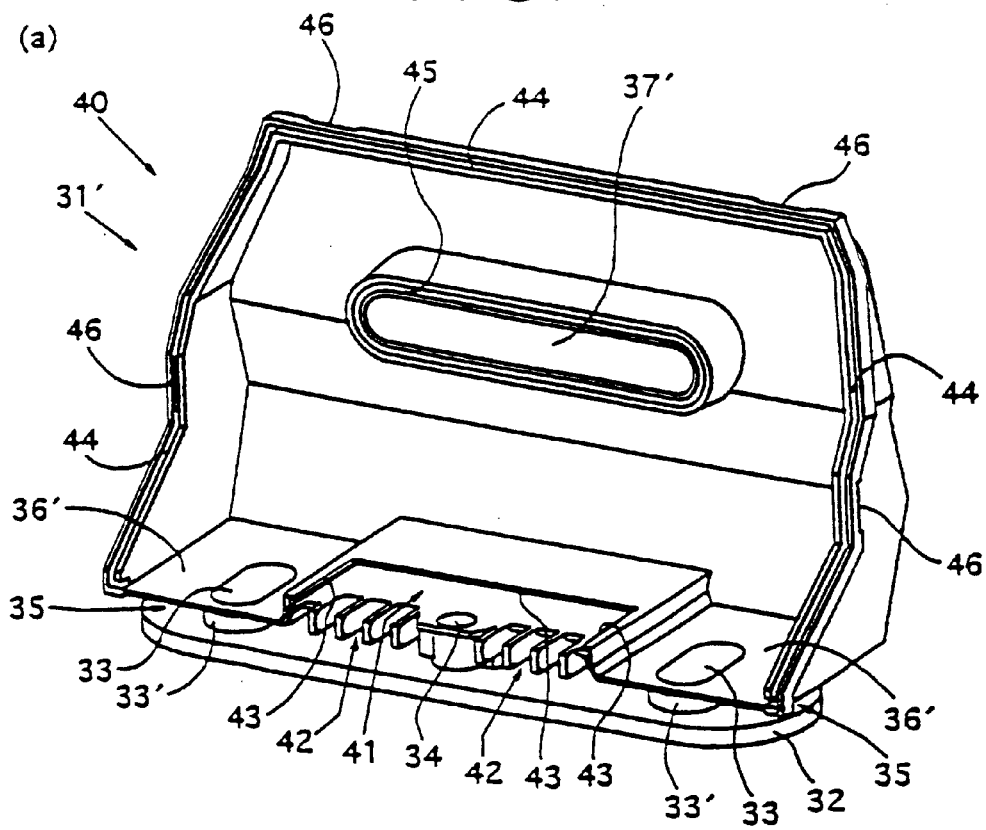
FIG. 4(a) is a perspective view of an inside of a front part of an inner cover used for the present invention and FIG. 4(b) is a perspective view of an outside of the front part of the inner cover.
Figure 4:
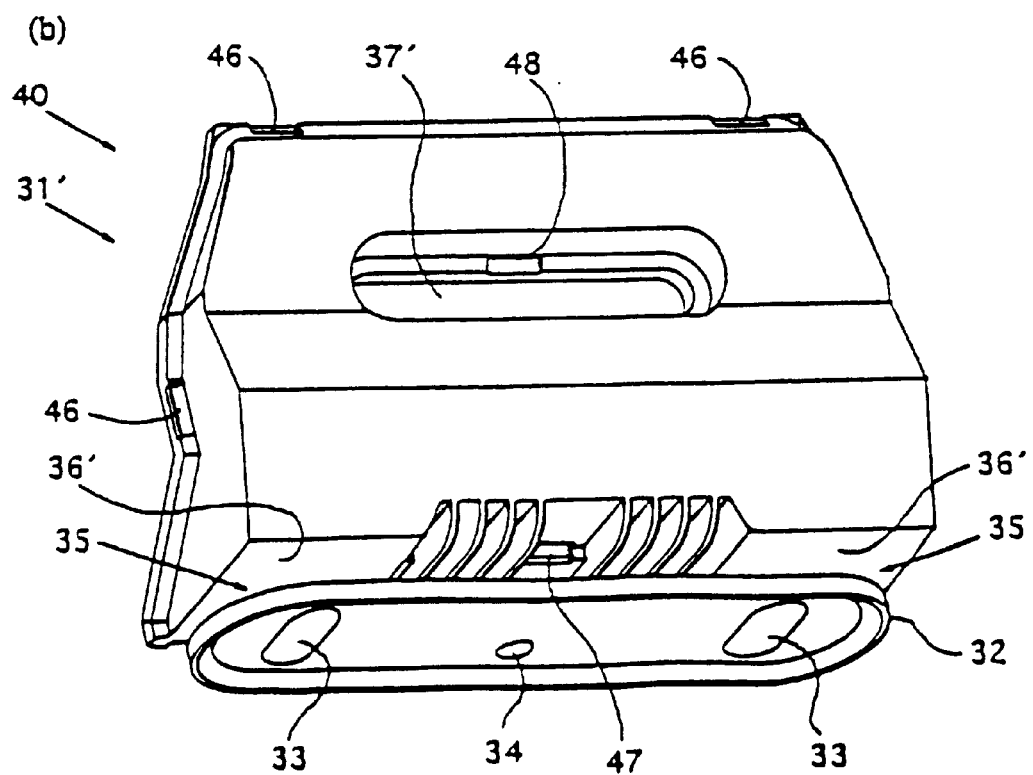
Figure 5:
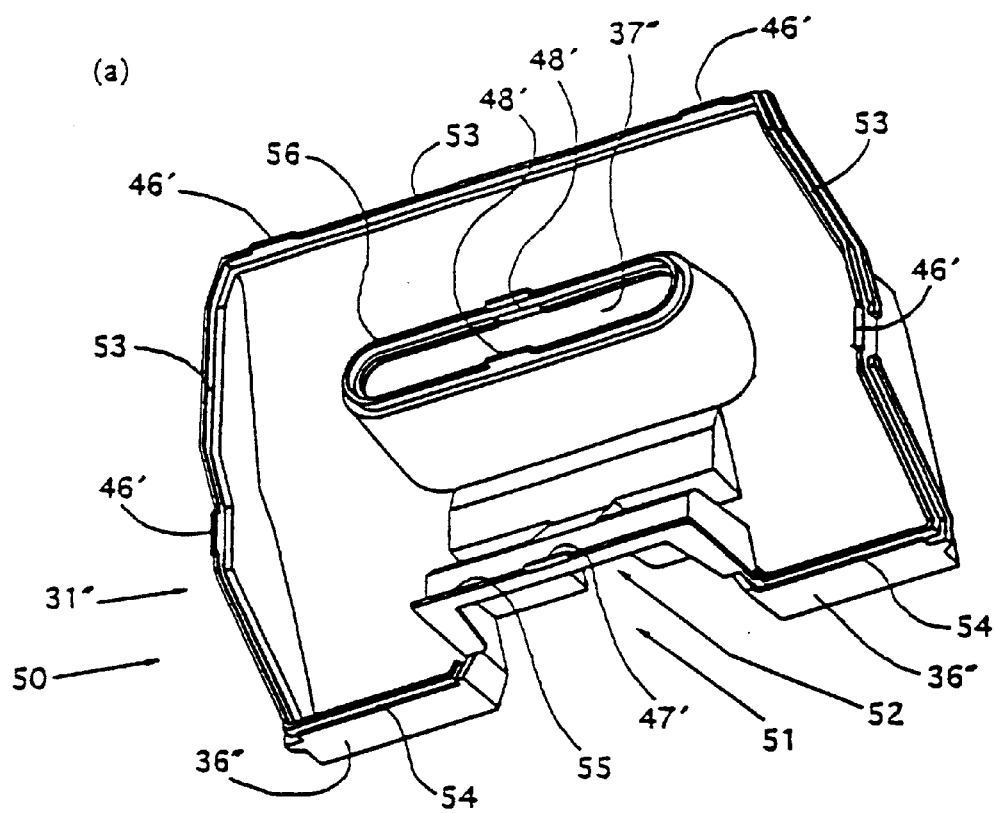
FIG. 5(a) is a perspective view of an inside of a rear part of an inner cover used for the present invention and FIG. 5(b) is a perspective view of an outside of the rear part of the inner cover.
Figure 5:
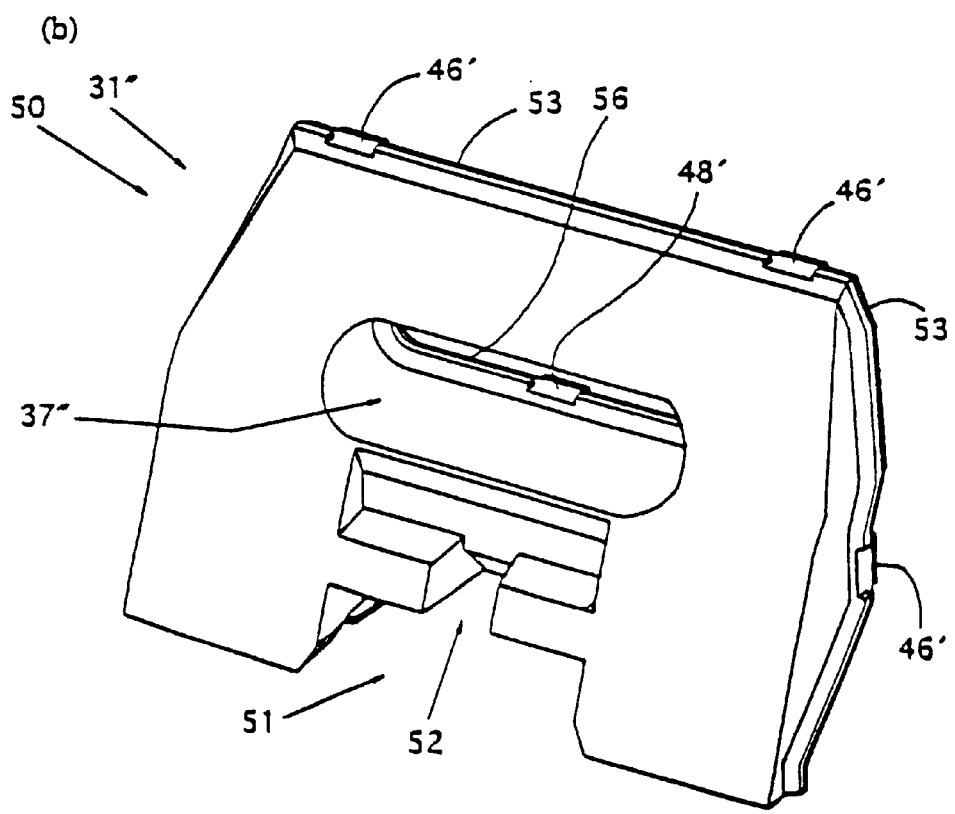

Preferably, the inner cover is composed of two portions such as a front portion (a first portion) and a rear portion (a second portion), as shown in FIGS. 4 and 5.

The front portion 40 comprises: a front side part 31' of the box part 31 of the inner cover 30; and the plate part 32 rigidly connected to a bottom 36' of the front side part 31' so as to have the gap 35 between the bottom 36' and the plate part 32 as described above. Meanwhile, the rear part 50 comprises a rear side part 31" of the box part 31, and when the front side part 50 is attached to the rear side part 50, the inner space of the box part 31 is formed so as to cover liquid-tightly the head angle adjusting mechanism 20 and the head frame of the stay frame assembly 10.

The front side part 50 can be attached to the rear side part 50 by fitting a tongue 53 formed on an edge of one part with a slot formed on an edge of another part and then latching those parts, and thereby, both parts can be liquid-tightly connected to each other.

As shown in FIGS. 4(a), 4(b), 5(a) and 5(b), the tongue 53 is provided along the edge of the left and right sides and the top side of the rear part 50, and the slot 44 is provided along the edge of the left and right sides and the top side of the front part 40, and thus, the front and rear parts 40, 50 are liquid-tightly connected to each other by fitting the tongue 53 of the rear part 50 with the slot 44 of the front part 40 and then latching those parts 40, 50 by latches 46, 46' provided on their left and right sides and their top sides, and thereby, the box part 31 of the inner cover 30 is formed.

In a central rear part 41 of the bottom 36' of the front part 40, a U-shaped wall 43 is provided over the left and right sides and the front side so as to form a half-annular socket cavity. Meanwhile, in a lower center of the rear part 50, a hollow 51 corresponding to a size of the central rear part 41 of the bottom 36' of the front part 40, and a flange 55 is provided horizontally along a lower end of this hollow 51. This flange 55 is slid and inserted in the socket cavity and, at the same time, both rims in both sides of the bottom 36' of the central rear part 41 of the front portion 40 is inserted in the slot 54 provided along the circumference of both sides of the bottom 36" of the hollow 51 of the rear portion 50, and then those portions are latched by use of latches 47, 47', and thereby, the bottom 36' of the front portion 40 and the bottom 36" of the rear portion 50 are liquid-tightly connected, and thus, the bottom 36 of the box part 31 of the inner cover 30 is formed.

In addition, an ellipse like opening 37' extending left and right is provided on a central part of the front portion 40, and a slot 45 is formed along the end of this opening 37'.

Meanwhile, an ellipse like opening 37" extending left and right is provided on a central part of the rear portion 50, and a tongue 56 is provided along the end of this opening 37". The tongue 56 of the rear portion 50 is inserted in the slot 45 of this opening 37', and both portions are latched by use of latches 46, 46', and thereby, both openings 37', 37" are liquid-tightly connected to each other, and thus, the opening 37 (see FIG. 1) passing through the box part 31 from its front side to its rear side is formed in a central part of the box part 31 of the inner cover 30. As described later, this opening 37 serves to effectively cover the box part 31 with a liquid expandable material flowed between the surface material 70 and the box part 31 of the inner cover 30, and thereby, a cavity is not produced in the foamed cushion pad 60 and the foamed cushion pad 60 is formed so as to entangle the box part 31.

As shown in FIGS. 4(a) and 4(b), a pair of slots 33 are provided in the plate part 40 so as to communicate with the inside of the front portion 40. As shown in FIG. 1, the leg parts 12 of the base frame 11 are extending outside the front portion 40 through those slots 33, and the front sides of the head frame 14 and the head angle adjusting mechanism 20 are placed on the inside of this front portion 40. Then, the rear portion 50, as described above, is connected liquid-tightly to the front portion 40, and thereby, the head frame and the head angle adjusting mechanism are liquid-tightly contained inside the box part 31 of the inner cover 30. Note that the head frame 14 is fitted with the inside of the front portion 40 and the rear portion 50, and the inner cover 30 can be tilted backward and forward together with the head frame 40 with respect to the axial rod 13 rigidly connected to the base frame 11. In addition, the shape of each slot 33 formed in the plate part 32 is an ellipse like shape extending backward and forward so as to tilt the head frame 14 backward and forward together with the front portion 40 with respect to the base frame 11.

When the front and rear portions 40, 50 are connected to each other as described above, the central rear area (or part) 41 (FIG. 4(a)) of the bottom 36' of the front portion 40 is exposed outside the inner cover 30 through the hollow 51 (FIG. 4(b)) provided in the rear part 50.

As shown in FIG. 4(a), a plurality of windows 42 as a fluid passage communicating with the gap 35 between the bottom 36 of the inner cover 30 and the plate part 32 are provided in the central rear part 41 exposed outside the inner cover 30. Also, a liquid expandable material injecting nozzle inlet 34 is provided in the central rear part 41 so as to pass through both of the plate part 32 and the central rear part 41. In addition, as shown in FIG. 5(b), a liquid expandable material injecting nozzle guide channel 52 is vertically formed above the hollow 51 of the rear portion 50 so as to position below the opening 37" and on an axis of the liquid expandable material injecting nozzle inlet 34 formed in the central rear part 41 of the front portion 40.

Preferably, as shown in FIG. 4(a), the windows 42 as the fluid passage formed in the central rear part 41 of the front portion 40 are formed by a plurality of ribs extending parallel to the plate part 32. In addition, as shown in FIG. 4(b), a plurality of ribs are provided on a lower part of the front side 31' of the front portion 40, as well as the central rear part 41. As described later, when a liquid expandable material is injected by use of a liquid expandable material injecting nozzle (not shown) passed upward through the inlet 34 and the channel 52 so as to position just below the opening 37", those ribs provided in the central lower part of the front side 31' and the central rear part 41 serve to effectively introduce the liquid expandable material into the gap 35 between the bottom 36 of the box part 31 and the plate part 32.

The surface material 70 is seamed in a box like shape corresponding to an outline of the headrest. The surface material 70 has an inner space and an opening (not shown) extending left and right, and this opening communicates with the inner space of the surface material 70 and is provided in a part corresponding to the bottom of the headrest. As described below, a circumferential part of the opening is inserted and held in the gap 35 between the box part 31 and the plate part 32. That is, the circumferential part of the opening of the surface material 70 is freely held in the gap 35 so that this circumferential part allows an expansion of the whole of the surface material 70 without locally acting a tension to this circumferential part when a liquid expandable material is foamed between the box part 31 and the surface material 70.

A headrest of the present invention is manufactured as follows.

Firstly, as described above, the head frame 14 and the head angle adjusting mechanism 20 of the stay frame assembly 10 is contained in the inner cover 30. Then, the box part 31 of the inner cover 30 is contained in the surface material 70 through the opening of the surface material 70, and the circumferential part of the opening of the surface material 70 is freely held in the gap 35 between the bottom 36 of the box part 31 and the plate part 32 of the inner cover 30.

Then, a liquid expandable material injecting nozzle (not shown) is inserted between the box part 31 and the surface material 70 through the inlet 34 formed in the plate part 32 of the inner cover 30, and a tip of the nozzle is positioned just below the opening 37 of the box part 31 through the nozzle guide channel 52 formed in the rear portion 50. Then, a well-known expandable material such as urethane is injected from the rear side of the inner cover 30 and is injected between the surface material 70 and the box 31. The liquid expandable material injected flows upward along the surface of the rear portion 50. The liquid expandable material also flows through the opening 37 of the box part 31 and then flows along the surface of the front portion 40. The liquid expandable material flows downward along the surface of the rear portion 50, passes through a plurality of windows 42 as a fluid passage and is introduced between the bottom 36 of the box part 31 and the circumferential part of the opening of the surface material 70 freely held in the gap 35. Meanwhile, the liquid expandable material flows downward along the surface of the front portion 40 is introduced between the bottom 36 of the box part 31 and the circumferential part of the opening of the surface material 70 freely held in the gap 35 through a plurality of ribs formed on the lower part of the front portion 40. Note that the head frame 14 and the head angle adjusting mechanism 20 are liquid-tightly contained inside the inner cover 30 as described above, and thus, the liquid expandable material injected is not introduced inside the inner cover 30.

Finally, the liquid expandable material is foamed between the surface material 70 and the box part 31 of the inner cover 30. A foamed body (that is, a foamed cushion pad 60) of this expandable material is molded together with the surface material 70. The liquid expandable material introduced between the bottom 36 of the box part 31 and the circumferential part of the opening of the surface material 70 freely held in the gap 35 is foamed so as to press the circumferential part of the opening of the surface material 70 onto the plate part 32 so that the opening of the surface material 70 is completely closed at the gap 35 and the surface material 70 is strongly held in the gap 35. Thereafter, the nozzle is taken out through the inlet 34 and the inlet 34 is then capped with a cap 80 (FIG. 1). The headrest as shown in FIG. 1 is manufactured as described above.

Advantageously, the present invention has several effects as described below.

As described above, the head frame is covered with the inner cover so as to pass the leg part of the base frame through the slot of the inner cover and extend the leg part outside the inner cover and the head angle adjusting mechanism is also covered with the inner cover so as to tilt the head frame backward and forward together with the inner cover. Thus, the foamed cushion pad cannot be introduced inside the inner cover and does not hamper the functions of the head angle adjusting mechanism.

Moreover, in the present invention, the head frame and the head angle adjusting mechanism are contained in the inner cover and the inner cover is covered with the foamed body. Thus, in order to recycle parts used for the head rest of the present invention, it is easily done to make components of a vehicle such as a headrest into pieces without taking much time and costing much labor.

Furthermore, in the present invention, the circumferential part of the opening of the surface material is inserted in the gap between the box part and the plate part of the inner cover. Thus, when a liquid expandable material is foamed, the opening of the surface material is closed by the plate part of the inner cover so that the circumferential part of the opening of the surface material can be held tightly.

What is claimed is:

1. A headrest comprising:
    (1) a stay frame assembly having
        a base frame having at least one leg part extending downward, said leg part serving to attach the headrest to a seat;
        a head frame connected to a top part of said base frame so as to freely tilt said head frame backward and forward with respect to said base frame; and
        a head angle adjusting mechanism for adjusting a tilting angle of said head frame with respect to said base frame;
    (2) an inner cover having
        a box part for containing said head frame and said head angle adjusting mechanism; and
        a plate part connected to a bottom of said box part so as to leave a gap between said plate part and the bottom of said box part, at last one slot communicating with an inner space of said box part being formed on said plate part, said leg part of said base frame extending outside said inner cover through said slot, said inner cover tilting backward and forward together with said head frame;
    (3) a surface material having an inner space and an opening communicating with said inner space, an outline of the surface material corresponding to an outline of the headrest; and
    (4) a foamed cushion pad molded together with said surface material such that a liquid expandable material is foamed in said inner space of said surface material so as to cover around said box part of said inner cover, a rim part of said opening of said surface material inserted in said gap between said bottom of said box part of said inner cover and said plate part thereof being held in said gap by said foamed cushion pad.

2. A headrest of claim 1 wherein said slot has a space formed so as to tilt said inner cover together with said head frame backward and forward.

3. A headrest of claim 2 wherein said second portion includes a plurality of ribs formed vertically along its lower surface so as to extend into said gap.

4. A headrest of claim 2 wherein the shape of said slot is an ellipse extending backward and forward.

5. A headrest of any one of claims 2 or 4 wherein said inner cover has an opening passing through its central part from its front side to its rear side.

6. A headrest of claim 5 wherein said box part of said inner cover has a first portion having said plate part connected to said bottom so as to form said gap and having a first opening passing through its central part from its front side to its rear side; and a second portion having a second opening passing through its central part from its front side to its rear side, thereby, when an edge of said first portion is connected to an edge of said second portion, an opening passing through a central part of said box part from its front side to its rear side is formed and said inner space of said inner cover is formed, said head frame being fixed in said inner space of said box part, and said head frame and said head angle adjusting mechanism being liquid-tightly contained in said inner space of said box part.

7. A headrest of claim 6 wherein said first portion includes a first tongue and a first slot provided along an edge thereof and along an edge of said first opening, and said second portion includes a second tongue and a second slot along an edge thereof and along an edge of said second opening, thereby, the edge of said first portion and the edge of said first opening are connected to the edge of said second portion and said edge of said second opening, such that said first tongue is fitted with said second slot, said second tongue is fitted with said first slot and said first and second portions are latched to each other.

8. A headrest of claim 7 wherein said second portion includes a plurality of ribs formed vertically along its lower surface so as to extend into said gap.

9. A headrest of claim 6 wherein said first portion further includes: a fluid passage provided in an area of a part of said bottom, said fluid passage communicating with said gap; and a liquid expandable material injecting nozzle inlet provided so as to pass through said plate part, and said second portion further includes: a hollow part corresponding to a size of said area of said bottom of said first portion, said hollow part being provided below said second opening so as to be hollow inward; and a liquid expandable material injecting nozzle guide channel vertically provided below said second opening and above said hollow part so as to position above said expandable material injecting nozzle inlet, thereby, when said first portion is connected to said second portion, said area of the bottom of said first portion is exposed outside said inner cover through said hollow part of said second portion.

10. A headrest of claim 9 wherein said first portion further includes: a first tongue and a first slot provided on an edge of its left and right sides and its upper side and on an edge of said first opening; and a slot formed of an L-shaped wall provided on the left and right sides and the innermost side of said area of said bottom, and said second portion further includes: a second tongue and a second slot provided on an edge of its left and right sides and its upper side and on an edge of said second opening; and a tongue provided on the lower side of said hollow part so as to expand inside said box part, whereby, said first portion and said first opening are connected to said second portion and said second opening, such that said first tongue is fitted with said second slot, said second tongue is fitted with said first slot, said tongue provided on the lower side of said hollow part of said second portion is slid into and fitted with said slot formed of an L-shaped wall provided on said area of said bottom of said first portion and said first and second portions are latched to each other.

11. A headrest of claim 10 wherein said fluid passage is formed of a plurality of ribs formed in said area of a part of the bottom of said first portion.

12. A headrest of claim 10 wherein said second portion includes a plurality of ribs formed vertically along its lower surface so as to extend into said gap.

13. A headrest of claim 9 wherein said fluid passage is formed of a plurality of ribs formed in said area of a part of said bottom of said first portion.

14. A headrest of claim 13 wherein said second portion includes a plurality of ribs formed vertically along its lower surface so as to extend into said gap.

15. A headrest of claim 9 wherein said second portion includes a plurality of ribs formed vertically along its lower surface so as to extend into said gap.

16. A headrest of claim 6 wherein said second portion includes a plurality of ribs formed vertically along its lower surface so as to extend into said gap.

17. A headrest of any one of claims 2 or 4 wherein said box part of said inner cover has a first portion having said plate part connected to said bottom so as to form said gap; and a second portion, and when an edge of said first portion is connected to an edge of said second portion, said inner space of said box part of said inner cover is formed, and said head frame is fixed in said inner space of said box part and said head frame and said head angle adjusting mechanism are liquid-tightly contained in said inner space of said box part.

18. A headrest of claim 17 wherein said first portion includes a first tongue and a first slot provided on an edge thereof, and said second portion includes a second tongue and a second slot provided on an edge thereof, thereby, the edge of said first portion is connected to the edge of said second portion such that said first tongue is fitted with said second slot, said second tongue is fitted with said first slot and said first and second portions are latched to each other.

19. A headrest of claim 18 wherein said second portion includes a plurality of ribs formed vertically along its lower surface so as to extend into said gap.

* * * * *

UNITED STATES PATENT AND TRADEMARK OFFICE
CERTIFICATE OF CORRECTION

PATENT NO. : 6,499,805 B1 Page 1 of 1
DATED : December 31, 2002
INVENTOR(S) : Takeshi Watadani It is certified that error appears in the above-identified patent and that said Letters Patent is hereby corrected as shown below:

Column 10,
Line 15, "2 or 4" should be replaced with -- 1, 2 or 4 --.

Column 12,
Line 7, "2 or 4" should be replaced with -- 1, 2 or 4 --.

Signed and Sealed this

Eighth Day of November, 2005

JON W. DUDAS
*Director of the United States Patent and Trademark Office*